United States Patent
Cheng et al.

(10) Patent No.: US 9,209,485 B2
(45) Date of Patent: Dec. 8, 2015

(54) ELECTROLYTIC COPPER FOIL

(71) Applicant: Chang Chun Petrochemical Co., Ltd., Taipei City (TW)

(72) Inventors: Kuei-Sen Cheng, Taipei (TW); Chyen-Fu Lin, Taipei (TW); Jui-Chang Chou, Taipei (TW); Chih-Sheng Lu, Taipei (TW)

(73) Assignee: CHANG CHUN PETROCHEMICAL CO. LTD., Taipei (TW)

( * ) Notice: Subject to any disclaimer, the term of this patent is extended or adjusted under 35 U.S.C. 154(b) by 0 days.

(21) Appl. No.: 14/217,596

(22) Filed: Mar. 18, 2014

(65) Prior Publication Data

US 2015/0030873 A1  Jan. 29, 2015

(30) Foreign Application Priority Data

Jul. 23, 2013 (TW) .............................. 102126230 U
Nov. 11, 2013 (TW) .............................. 102140840 U

(51) Int. Cl.
*C25D 7/06* (2006.01)
*H01M 10/0562* (2010.01)
*C25D 3/38* (2006.01)
*H01M 10/0525* (2010.01)

(52) U.S. Cl.
CPC ............. *H01M 10/0562* (2013.01); *C25D 3/38* (2013.01); *C25D 7/0614* (2013.01); *H01M 10/0525* (2013.01); *Y10T 428/12431* (2015.01)

(58) Field of Classification Search
None
See application file for complete search history.

(56) References Cited

U.S. PATENT DOCUMENTS

| | | | | |
|---|---|---|---|---|
| 3,084,063 | A | * | 4/1963 | Carrington et al. ............ 428/469 |
| 3,743,584 | A | * | 7/1973 | Todt et al. ...................... 205/298 |
| 5,431,803 | A | | 7/1995 | DiFranco et al. |
| 5,958,209 | A | | 9/1999 | Sakai et al. |
| 8,349,518 | B2 | | 1/2013 | Kim et al. |
| 2005/0158574 | A1 | * | 7/2005 | Suzuki et al. .................. 428/615 |
| 2012/0015206 | A1 | * | 1/2012 | Kim et al. ...................... 428/606 |
| 2014/0193655 | A1 | * | 7/2014 | Kurosaki ........................ 428/544 |

FOREIGN PATENT DOCUMENTS

JP  2011-174146  9/2011
WO  WO2014/002996 A1  1/2014

* cited by examiner

*Primary Examiner* — David Sample
*Assistant Examiner* — Nicholas W Jordan
(74) *Attorney, Agent, or Firm* — Novak Druce Connolly Bove + Quigg LLP

(57) ABSTRACT

An electrolytic copper foil, which is particularly suitable for the application of a lithium ion secondary battery, has a shiny side and a matte side with a roughness of less than 2 μm. Based on the total sum of the texture coefficients of a (111) surface, a (200) surface, a (220) surface and a (311) surface of the electrolytic copper foil, the sum of the texture coefficients of the (220) surface and the (311) surface of the electrolytic copper foil is greater than 60%.

19 Claims, No Drawings

ELECTROLYTIC COPPER FOIL

REFERENCE TO RELATED APPLICATIONS

This application claims foreign priority under 35 U.S.C. §119(a) to Patent Application No. 102126232, filed on Jul. 23, 2013, and Patent Application No. 102140840, filed on Nov. 11, 2013, in the Intellectual Property Office of Ministry of Economic Affairs, Republic of China (Taiwan, R.O.C.), the entire contents of each of which Patent Applications are incorporated herein by reference.

FIELD OF THE INVENTION

The present invention relates to electrolytic copper foils, and more particularly, to an electrolytic copper foil applicable to a charging-discharging battery.

BACKGROUND OF RELATED ART

Due to the increasing concerns of environmental awareness, gradually single-use batteries (primary batteries) have been replaced by the high performance secondary batteries which are widely used in consumer electronic products, energy storage systems, and other industries.

Following the development of auto industry, the demands for lithium ion secondary batteries have increased. Besides the demands for favorable charging-discharging performances, the safety and battery life of lithium ion secondary batteries should also be taken into consideration. The development trend of lithium ion secondary batteries is moving toward developing power storage batteries for energy storage systems. In order to develop lithium ion secondary batteries to fulfill the system-scale requirements and satisfy the development trend of energy storage technologies, the battery capacitance of the lithium ion secondary battery has to reach the scale of MW/MWh, the cycle life of the lithium ion secondary battery used in a mobile phone should be over 2000 times and the cycle life of the lithium ion secondary battery used in an energy storage system should be over 6000 times.

A lithium ion secondary battery is produced by coiling an anode plate, a separation membrane, and a cathode plate, placing the anode plate, separation membrane and cathode plate into a container, adding an electrolyte and sealing the container, wherein the anode plate is consisting of a anode current collector constructed by a copper foil and an anode active material (such as a carbon-based material) which is coated on the surface of the anode current collector. The copper foil can be a rolled copper foil or an electrolytic copper foil. In addition, the electrolytic copper foil is manufactured by using the aqueous solution consisting of sulfuric acid and copper sulfate as an electrolyte, using a titanium plate coated by iridium element or iridium oxide as a dimensionally stable anode (DSA), using a titanium drum as a cathode, applying direct current between two electrodes to electrodeposit copper ions from the electrolyte on the titanium drum, peeling off the electrolytic copper foil from the surface of the titanium drum and continuously winding. The surface of the electrolytic copper foil that is contacting the surface of the titanium drum is called "shiny side (S side)," and the other side is called "matte side (M side)." In general, the roughness of the S side of the electrolytic copper foil is determined by the roughness of the surface of the titanium drum. Therefore, the roughness of the S side is more consistent, and the roughness of the M side is controlled by adjusting the condition of the copper sulfate electrolyte.

Based on the above, in order to reduce the roughness of the M side of the electrolytic copper foil, it is known that the crystalline phase of the electrolytic copper foil is changed by adding an organic additive, such as glue with a small molecular weight (e.g. gelatin), hydroxyethyl cellulose (HEC), or polyethylene glycol (PEG), and adding a sulfur-containing compound such as sodium 3-mercapto-1-propanesulfonate (MPS) or bis-(3-sodiumsulfopropyl disulfide (SPS) with the effect of reducing (refining) the size of the crystals to the copper sulfate electrolyte.

With respect to the crystalline phase of the electrolytic copper foil obtained by a conventional method disclosed in KR 10-1117370, the sum of the texture coefficients of a (111) surface and a (200) surface of the electrolytic copper foil is between 60-85% based on the total sum of the texture coefficients (TC) of the (111) surface, the (200) surface and a (220) surface, wherein the texture coefficient ranges of the (111) surface and the (200) surface of the electrolytic copper foil are between 18-38% and 15-40%, respectively, so as to obtain an electrolytic copper foil with fine crystalline grain structure, which a roughness of the M side is lower and suitable for use in a lithium ion secondary battery.

Therefore, traditionally, when the texture coefficients of a (111) surface and a (200) surface of an electrolytic copper foil are higher, the crystalline grains of the electrolytic copper foil become smaller, the roughness of the M side become lower, the tensile strength of the electrolytic copper foil become higher, and the elongation become lower. On the contrary, when the texture coefficients of a (111) surface and a (200) surface of an electrolytic copper foil are lower and/or the texture coefficients of a (220) surface and a (311) surface of an electrolytic copper foil are higher, the crystalline grains of the electrolytic copper foil become larger and the roughness of the M side become higher.

Based on the above, it is known that for the electrolytic copper foil prepared by a conventional method, it is predictable that the texture coefficients of the (111) surface and the (200) surface are higher, such that the roughness of the M side is lower and the electrical capacity is increased. However, the electrolytic copper foil will be easily fractured due to expansion and shrinkage and leads to the reduction of a battery life.

Therefore, the urgent issue is to develop an electrolytic copper foil applied in a lithium ion secondary battery that has an M side with a lower roughness and increases the cycle life of the battery.

SUMMARY OF THE INVENTION

The present invention provides an electrolytic copper foil which has a shiny side and a matte side with a roughness of less than 2 μm, wherein based on the total sum of the texture coefficients of a (111) surface, a (200) surface, a (220) surface and a (311) surface of the electrolytic copper foil, the sum of the texture coefficients of the (220) surface and the (311) surface of the electrolytic copper foil is greater than 60%.

In one embodiment of the present invention, the sum of the texture coefficients of a (220) surface and a (311) surface of the electrolytic copper foil is greater than 70% based on the total sum of the texture coefficients of a (111) surface, a (200) surface, the (220) surface and the (311) surface of the electrolytic copper foil.

In one embodiment, the texture coefficient of the (311) surface of an electrolytic copper foil is greater than 1.

In one embodiment, an electrolytic copper foil has a shiny side and a matte side, and the roughness of the shiny side is less than 2 μm.

In one embodiment, an electrolytic copper foil has a shiny side and a matte side, and the roughness difference between the shiny side and the matte side is less than 0.5 μm. Furthermore, in another embodiment, the roughness difference between the shiny side and the matte side is less than 0.4 μm.

In addition, in one embodiment of the present application, the weight resistivity of an electrolytic copper foil is less than 0.2 Ωg/m².

In one further embodiment, the texture coefficient of the (111) surface of an electrolytic copper foil is less than 1, and the texture coefficient of the (200) surface of the electrolytic copper foil is less than 1.

In one embodiment, an electrolytic copper foil has an elongation of greater than 9%, and preferably, the electrolytic copper foil has an elongation of greater than 14%.

Furthermore, the (220) surface and (311) surface of the electrolytic copper foil of the present invention have promising crystalline phase characteristics, such that the elongation of the electrolytic copper foil can be greater than 14%. It is further discovered that the electrolytic copper foil with these crystalline phase characteristics resolves the problem of not suitable for use in a lithium ion secondary battery caused by the high roughness of traditional products. The roughness of the matte side of the electrolytic copper foil of the present invention is less than 2 μm, such that the roughness difference between the shiny side and the matte side is smaller. Therefore, the present invention is particularly suitable to be used as the electrolytic copper foil for a lithium ion secondary battery.

In addition, since the weight resistivity of the electrolytic copper foil of the present invention is less than 0.2 Ωg/m², it provides preferred charging-discharging efficiency.

Therefore, since the electrolytic copper foil of the present application has a completely different crystalline phase structure, the roughness of both sides of the electrolytic copper foil of the present invention is low, and the roughness difference between the two sides is extremely small, it is not easy for the electrolytic copper foil to break or fracture during the charging-discharging cycles and the life of a battery is thus increased.

DETAILED DESCRIPTION OF THE PREFERRED EMBODIMENTS

In the following, embodiments are provided to illustrate the detailed description of the present invention. Those skilled in the art can easily conceive the advantages and effects of the present invention, based on the disclosure of the specification. In the following examples, an electrolytic copper foil with a thickness of 6 or 10 μm was used, but the present invention is not limited by these embodiments.

Meanwhile, the phrase "substantially free" refers to a content of less than 1.2 ppm or zero.

For the preparation of the electrolytic copper foil of the present invention, an aqueous solution containing sulfuric acid and copper sulfate was used as the electrolyte, and a titanium drum was used as the cathode. The electrolytic copper foil was formed by applying direct current between anode and cathode to electrodeposit copper ions from the electrolyte on the cathode drum, so as to form the electrolytic copper foil. The thus-formed electrolytic copper foil was peeled off from the surface of the titanium drum and continuously winded. In the present application, the surface of the electrolytic copper foil that is contacting the surface of the titanium drum is called "shiny side (S side)," and the other side is called "matte side (M side)."

Traditionally, an organic additive, such as glue with a small molecular weight (e.g. gelatin), hydroxyethyl cellulose (HEC) or polyethylene glycol (PEG), and a sulfur-containing compound, such as sodium 3-mercaptopropane sulphonate (MPS), or bis-(3-sodiumsulfopropyl disulfide (SPS) is usually added to a copper sulfate electrolyte. However, the present invention found that the addition of acid-denatured polyvinyl alcohol, such as carboxylic acid-denatured polyvinyl alcohol, sulfonic acid-denatured polyvinyl alcohol or phosphoric acid-denatured polyvinyl alcohol, to the copper sulfate electrolyte leads to unexpected results. The sum of the texture coefficients of the (220) surface and the (311) surface of the thus-obtained electrolytic copper foil is greater than 60% based on the total sum of the texture coefficients of the (111) surface, the (200) surface, the (220) surface and the (311) surface of the obtained electrolytic copper foil. In one non-limitative embodiment, the sum of the texture coefficients of the (220) surface and the (311) surface of the thus-obtained electrolytic copper foil is between 60-90% based on the total sum of the texture coefficients of the (111) surface, the (200) surface, the (220) surface and the (311) surface of the obtained electrolytic copper foil. In addition, the elongation is significantly increased for, such as greater than 14%, or even up to 15%, and the roughness of the matte side is less than 2 μm.

Furthermore, the texture coefficient of the (311) surface of the electrolytic copper foil is greater than 1, even greater than 2, or up to 2.5. In the meantime, the roughness difference between the shiny side and the matte side is less than 0.5 μm, preferably less than 0.4 μm, or even down to 0.14 μm.

In addition, the present invention provides a simplified electrolyte composition without the addition of hydroxyethyl cellulose and/or polyethylene glycol and still achieves excellent results. Moreover, during the process for manufacturing the electrolytic copper foil of the present invention, the electrolyte does not contain ethylene thiourea.

EMBODIMENTS

Embodiment 1

The Preparation of the Electrolytic Copper Foil of the Present Invention

Copper wires were dissolved in a 50 wt % sulfuric acid aqueous solution to prepare a copper sulfate electrolyte containing 320 g/l of copper sulfate ($CuSO_4.5H_2O$) and 100 g/l of sulfuric acid. To per liter of the copper sulfate electrolyte, 5 mg of sulfonic acid-denatured polyvinyl alcohol (TA-02F; ChangChun PetroChemical, Co. Ltd.) and 1.2 mg of sodium 3-mercapto-1-propanesulfonate (MPS: HOPAX Company) were added.

Subsequently, an electrolytic copper foil with the thickness of 10 μm was prepared at the liquid temperature of 50° C. and the current density of 50 A/dm². The roughness, tensile strength, elongation and weight resistivity of the electrolytic copper foil of the present invention were measured. The crystalline phase structure of the electrolytic copper foil of Embodiment 1 was measured with X-ray diffraction to calculate the texture coefficient and the results are recorded in Table 3.

Embodiments 2-4

The Preparation of the Electrolytic Copper Foil of the Present Invention

The steps of Embodiment 1 were repeated, except that the amounts of sulfonic acid-denatured polyvinyl alcohol and glue with a small molecular weight (DV; Nippi Company) added in Embodiments 2-4 are shown in Table 1.

The results for testing the electrolytic copper foils are shown in Table 3.

Embodiments 5-6

The Preparation of the Electrolytic Copper Foil of the Present Invention

The steps of Embodiment 1 were repeated, except that the thicknesses of the electrolytic copper foils prepared in Embodiments 5 and 6 were 6 μm suitable for use in mobile phones, and the amounts of sulfonic acid-denatured polyvinyl alcohol and glue with a small molecular weight (DV; Nippi Company) added in Embodiments 5 and 6 are shown in Table 1.

The results for testing the electrolytic copper foils are shown in Table 4.

TABLE 1

|  | Embodiment 2 | Embodiment 3 | Embodiment 4 | Embodiment 5 | Embodiment 6 |
| --- | --- | --- | --- | --- | --- |
| Acid-denatured polyvinyl alcohol | 1.5 mg | 3 mg | 5 mg | 1.5 mg | 3 mg |
| Glue with a small molecular weight | 3.5 mg | 1.5 mg | 0.8 mg | 3.5 mg | 1.5 mg |

COMPARATIVE EXAMPLES

Comparative Example 1

The Preparation of an Electrolytic Copper Foil

Copper wires were dissolved in a 50 wt % sulfuric acid aqueous solution to prepare a copper sulfate electrolyte containing 320 g/l of copper sulfate ($CuSO_4 \cdot 5H_2O$) and 100 g/l of sulfuric acid. To per liter of the copper sulfate electrolyte, 1.5 mg of hydroxyethyl cellulose (LC-400; DAICEL Company), 3.5 mg of glue with a small molecular weight (DV; Nippi Company), and 1.2 mg of sodium 3-mercapto-1-propanesulfonate (MPS: HOPAX Company) were added.

Subsequently, the electrolytic copper foil with a thickness of 10 μm was prepared at the liquid temperature of 50° C. and the current density of 50 $A/dm^2$. The roughness, tensile strength, elongation and weight resistivity of the electrolytic copper foil of the present invention were measured. The crystalline phase structure of the electrolytic copper foil was measured with X-ray diffraction to calculate the texture coefficient and the results are recorded in Table 3.

Comparative Example 2

The Preparation of an Electrolytic Copper Foil

The steps of Comparative Example 1 were repeated, except that to per liter of the copper sulfate electrolyte, 1.5 mg of polyethylene glycol (PEG2000, Oriental Union Chemical Corporation) was used instead of hydroxyethyl cellulose.

The results for testing the electrolytic copper foil are recorded in Table 3.

Comparative Example 3

The Preparation of an Electrolytic Copper Foil

The steps of Comparative Example 1 were repeated, except that the amount of hydroxyethyl cellulose added to per liter of the copper sulfate electrolyte was 5 mg.

The results for testing the electrolytic copper foil are recorded in Table 3.

Comparative Example 4

The Preparation of an Electrolytic Copper Foil

The steps of Comparative Example 1 were repeated except that hydroxyethyl cellulose was not added, the amount of glue with a small molecular weight added to per liter of the copper sulfate electrolyte was 10 mg and the amount of sodium 3-mercapto-1-propanesulfonate added was 3.2 mg.

The results for testing the electrolytic copper foil are recorded in Table 3.

Comparative Example 5

The Preparation of an Electrolytic Copper Foil

The steps of Comparative Example 1 were repeated except that hydroxyethyl cellulose and sodium 3-mercapto-1-propanesulfonate were not added and the amount of glue with a small molecular weight added to per liter of the copper sulfate electrolyte was 0.5 mg.

The results for testing the electrolytic copper foil are recorded in Table 3.

Comparative Example 6

The Preparation of an Electrolytic Copper Foil

The steps of Comparative Example 1 were repeated except that the thickness of the electrolytic copper foil prepared in Comparative Example 6 was 6 μm.

The results for testing the electrolytic copper foil are recorded in Table 4.

Testing Example

The electrolytic copper foils prepared in the aforementioned Embodiments 1-6 and Comparative Examples 1-6 were cut to obtain test samples with a suitable size. The tensile strength, elongation, roughness, and weight resistivity of the test samples were measured. The crystalline phase structure of the electrolytic copper foil obtained from Embodiment 1 was measured by using X-ray diffraction to calculate the texture coefficient thereof. The methods used in Testing Example are described as below in details.

Tensile Strength:

Based on the method of IPC-TM-650, the electrolytic copper foil was cut to obtain a test sample with the size of 100 mm×12.7 mm (length×width), and the test sample was measured at room temperature (around 25° C.) under the conditions of a chuck distance of 50 mm and a crosshead speed of 50 mm/min by using Model AG-1 testing machine of Shimadzu Corporation.

Elongation:

Based on the method of IPC-TM-650, the electrolytic copper foil was cut to obtain a test sample with the size of 100 mm×12.7 mm (length×width), and the test sample was measure at room temperature (around 25° C.) under the conditions of a chuck distance of 50 mm and a crosshead speed of 50 mm/min by using Model AG-1 testing machine of Shimadzu Corporation.

Roughness Test (the Average Roughness of 10 Points, Rz):

The measurement was conducted based on the method of IPC-TM-650 by using a Type Surface Roughness Measuring Instrument (Kosaka Laboratory Ltd; SE1700 series).

Weight Resistivity Test:

Base on the method of IPC-TM-650 2.5.14, the electrolytic copper foil was cut to obtain a test sample with the size of 70 cm×3 cm (length×width), and the test sample was measured under the condition of a chuck distance of 50 cm by using Wheatstone bridge.

Texture Coefficient (TC):

An analysis was conducted by using PW3040 X-ray Diffractometer of PANalytical Corporation under conditions of the additional voltage of 45 kV, the current of 40 mA, scanning resolution of 0.04°, and scanning range (2θ) of 40°-95°. The texture coefficient of each test sample is calculated based on the following Equation (I).

$$TC(hkl) = \frac{I(hkl)/I_0(hkl)}{(1/n)\Sigma I(hkl)/I_0(hkl)} \qquad \text{Equation (I)}$$

In Equation (I), TC(hkl) is the texture coefficient of (hkl) crystalline surface. When TC value is greater, it means that the crystalline surface preferred orientation degree is higher. I(hkl) refers to the diffraction strength of the (hkl) crystalline surface of the test sample. $I_o$(hkl) refers to the diffraction strength (PDF#040836) of the (hkl) crystalline surface of standard copper powder defined by American Society of Testing Materials (ASTM). N refers to the quantity of the diffraction peaks within a specific range of diffraction angles (2θ).

Test of Battery Charging-Discharging:

The Preparation of a Lithium Ion Secondary Battery

A cathode slurry was prepared by using 1-methyl-2-pyrrolidone (NMP) as a solvent and the cathode materials listed in Table 2 with a solid-liquid ratio of 195 wt % (100 g of cathode materials:195 g of NMP). An anode slurry was prepared by using water as a solvent and the anode materials listed in Table 2 with a solid-liquid ratio of 73 wt % (100 g of anode materials; 73 g of water).

Then, the cathode slurry was applied on an aluminum foil and the anode slurry was applied on the electrolytic copper foils prepared by aforementioned Embodiments 1-6 and Comparative Examples 1-6. After the solvent was evaporated, anode and cathode plates were obtained.

Prior to assembling the battery, the anode plates were baked in a 140° C. oven for 5 hours to remove the moisture on the surface of the carbon-based materials. Then, an anode plate, a separation membrane (Celgard LLC Corporation), and a cathode plate were winded, and placed in a container. An electrolyte was added to the container and the container was sealed to provide a battery. The specification of the battery follows the general 18650 cylinder battery.

The electrolyte was prepared by adding 1M of lithium hexafluorophosphate ($LiPF_6$) and 2 of wt % vinylene carbonate (VC) in a mixture of ethylene carbonate (EC) and ethyl methyl carbonate with a volume ratio of 1:2 and was used to conduct the charging-discharging tests for the lithium ion secondary batteries prepared by using the electrolytic copper foils obtained from Embodiments 1-6 and Comparative Examples 1-6.

TABLE 2

| Cathode Material Formulation: | Based on the total weight of the cathode materials |
|---|---|
| Cathode active material ($LiFePO_4$) | 83 wt % |
| Conductive additive (graphite; KS6) | 5 wt % |
| Conductive additive (conductive carbon powder; Super P) | 2 wt % |
| Solvent-based binder (PVDF1300) | 10 wt % |

| Anode Material Formulation: | Based on the total weight of the anode materials |
|---|---|
| Anode active material (MGPA) | 95 wt % |
| Conductive additive (conductive carbon powder; Super P) | 1 wt % |
| Thickening agent (CMC) | 1.6 wt % |
| Water-based binder (SBR) | 2.4 wt % |

Charging-Discharging Test:

The lithium ion secondary batteries which were prepared by using the electrolytic copper foils obtained from Embodiments 1-4 and Comparative Examples 1-5 were repeatedly charged and discharged for 6000 cycles, and then the lithium ion secondary batteries were disassembled to observe whether any cracks existed on the copper foils. The lithium ion secondary batteries which were prepared by using the electrolytic copper foils obtained from Embodiments 5-6 and Comparative Example 6 were repeatedly charged and discharged for 2000 cycles, and then the lithium ion secondary batteries were disassembled to observe whether any cracks existed on the copper foils. The charging was conducted based on CCCV (constant current constant voltage) model under the conditions of charging voltage of 3.75 V and charging current of 1 C. The discharging was conducted based on CC (constant current) model under the conditions of discharging voltage of 2.8 V and discharging current of 1 C. The charging-discharging tests of the batteries were conducted at room temperature (25° C.).

TABLE 3

Test results of the characteristics of electrolytic copper foil

| | Embodiment 1 | Embodiment 2 | Embodiment 3 | Embodiment 4 | Comparative Example 1 | Comparative Example 2 | Comparative Example 3 | Comparative Example 4 | Comparative Example 5 |
|---|---|---|---|---|---|---|---|---|---|
| Tensile strength ($kg/mm^2$) | 31.9 | 31.6 | 31.4 | 31.6 | 33.4 | 32.3 | 31.3 | 31.1 | 38.6 |
| Elongation (%) | 15.4 | 14.2 | 15.1 | 15.6 | 9.5 | 9.8 | 10.1 | 8.2 | 10.6 |
| Roughness of S side, Rz (μm) | 1.73 | 1.86 | 1.75 | 1.68 | 1.72 | 1.76 | 1.72 | 1.70 | 1.76 |
| Roughness of M side, Rz (μm) | 1.56 | 1.50 | 1.49 | 1.54 | 1.56 | 1.62 | 1.58 | 1.49 | 2.42 |

TABLE 3-continued

Test results of the characteristics of electrolytic copper foil

|  | Embodiment 1 | Embodiment 2 | Embodiment 3 | Embodiment 4 | Comparative Example 1 | Comparative Example 2 | Comparative Example 3 | Comparative Example 4 | Comparative Example 5 |
|---|---|---|---|---|---|---|---|---|---|
| Roughness (Rz) difference between S side and M side (μm) | 0.17 | 0.36 | 0.26 | 0.14 | 0.16 | 0.14 | 0.14 | 0.21 | 0.66 |
| Weight resistivity (Ωg/m$^2$) | 0.154 | 0.156 | 0.154 | 0.155 | 0.163 | 0.162 | 0.160 | 0.161 | 0.155 |
| TC (111) | 0.23 | 0.62 | 0.33 | 0.32 | 1.03 | 0.98 | 0.91 | 1.01 | 0.30 |
| TC (200) | 0.23 | 0.58 | 0.30 | 0.33 | 1.85 | 1.51 | 1.66 | 1.63 | 0.18 |
| TC (220) | 1.04 | 1.08 | 1.07 | 1.06 | 0.82 | 0.72 | 0.77 | 0.70 | 3.20 |
| TC (311) | 2.50 | 1.72 | 2.30 | 2.29 | 0.30 | 0.79 | 0.66 | 0.66 | 0.32 |
| TC (220) + TC (311)/ TC (total)% | 89 | 70 | 84 | 84 | 28 | 38 | 36 | 34 | 88 |
| Crack on copper foil after charging-discharging test | No | No | No | No | Yes | Yes | Yes | Yes | Yes |

TABLE 4

Test results of the characteristics of electrolytic copper foil

|  | Embodiment 5 | Embodiment 6 | Comparative Example 6 |
|---|---|---|---|
| Tensile strength (kg/mm$^2$) | 33.7 | 33.5 | 34.5 |
| Elongation (%) | 9.4 | 9.7 | 6.2 |
| Roughness of S side, Rz (μm) | 1.85 | 1.77 | 1.74 |
| Roughness of M side, Rz (μm) | 1.55 | 1.54 | 1.58 |
| Roughness (Rz) difference between S side and M side (μm) | 0.30 | 0.23 | 0.16 |
| Weight resistivity (Ωg/m$^2$) | 0.157 | 0.156 | 0.163 |
| TC(111) | 0.84 | 0.71 | 1.04 |
| TC(200) | 0.71 | 0.66 | 1.87 |
| TC(220) | 1.09 | 1.09 | 0.80 |
| TC(311) | 1.36 | 1.54 | 0.29 |
| TC(220) + TC(311)/TC(total) % | 61 | 66 | 27 |
| Crack on copper foil after charging-discharging test | No | No | Yes |

Conventionally, it is considered that the relatively higher texture coefficients of the (220) surface and (311) surface of an electrolytic copper foil contributes to the larger size of crystalline grain with higher roughness of M side as indicated in Comparative Example 5. However, based on the results of Tables 3 and 4, even though the texture coefficients of the (220) surface and (311) surface of the electrolytic copper foil of the present invention were relatively higher, the roughness of M side became smaller. Under the condition that the roughness difference was reduced, the carbon-based material can be evenly applied on both sides, so as to improve the charging-discharging cycle life of the batteries.

As shown in Tables 3 and 4, the electrolytic copper foil of the present invention had relatively higher elongation and lower weight resistivity. Further, the electrolytic copper foil of the present application with a thickness of 6 μm satisfied the need of 2000 times of battery charging-discharging tests and had no cracks after the tests. Also, the electrolytic copper foil of the present application with a thickness of 10 μm satisfied the need of 6000 times of battery charging-discharging tests and had no cracks after the tests as shown in Table 3.

In summary, the electrolytic copper foil of the present invention had a completely different crystalline phase structure. Under the conditions that the roughness of both sides of the electrolytic copper foil of the present invention were low and the roughness difference between both sides was extremely small, it was thus not easy for the electrolytic copper foil to break or fracture during the charging-discharging cycles and the life of a battery is thus increased.

The above embodiments are only used to illustrate the principle of the present invention and the effect thereof, and should not be construed as to limit the present invention. The above embodiments can be modified and altered by those skilled in the art, without departing from the spirit and scope of the present invention. Therefore, the protection scope of the present invention is defined in the following appended claims. As long as it does not affect the effects and achievable goals of this invention, it should be covered under the technical contents disclosed in this invention.

What is claimed is:

1. An electrolytic copper foil, comprising a shiny side and a matte side, each of the shiny side and matte side have a surface roughness of less than 2 μm, the electrolytic copper foil also possessing texture coefficients for each of a (111) surface, a (200) surface, a (220) surface and a (311) surface; wherein based on a total sum of the texture coefficients of the (111) surface, the (200) surface, the (220) surface and the (311) surface of the electrolytic copper foil, a sum of texture coefficients of the (220) surface and the (311) surface of the electrolytic copper foil is greater than 60%, with the proviso that the texture coefficient of the (311) surface is at least 1.36.

2. The electrolytic copper foil of claim 1, wherein the texture coefficient of the (311) surface of the electrolytic copper foil is greater than 2.

3. The electrolytic copper foil of claim 1, wherein a surface roughness difference between the shiny side and the matte side is less than 0.5 μm.

4. The electrolytic copper foil of claim 3, wherein the surface roughness difference between the shiny side and the matte side is less than 0.4 μm.

5. The electrolytic copper foil of claim 4, wherein the surface roughness difference between the shiny side and the matte side is less than 0.14 μm.

6. The electrolytic copper foil of claim 1, wherein a weigh resistivity of the electrolytic copper foil is less than 0.2 Ωg/m².

7. The electrolytic copper foil of claim 1, wherein the texture coefficient of the (111) surface of the electrolytic copper foil is less than 1.

8. The electrolytic copper foil of claim 1, wherein the texture coefficient of the (200) surface of the electrolytic copper foil is less than 1.

9. The electrolytic copper foil of claim 1, which has an elongation of greater than 9%.

10. The electrolytic copper foil of claim 1, which has an elongation of greater than 14%.

11. The copper foil of claim 1, comprising, a thickness in the range of 6 to 10 microns.

12. A secondary battery comprising the copper foil of claim 1.

13. A cellular telephone comprising the secondary battery of claim 12.

14. The cellular telephone comprising the secondary battery of claim 13 having charging-discharging cycle in excess of 2000 times.

15. An energy storage system comprising the secondary battery of claim 12.

16. An energy storage system comprising the secondary battery of claim 12 having a charging-discharging cycle in excess of 6000 times.

17. An electrolytic copper foil, comprising a shiny side and a matte side, each of the shiny side and matte side have a surface roughness of less than 2 μm, the electrolytic copper foil also Possessing texture coefficients for each of a (111) surface, a (200) surface, a (220) surface and a (311) surface;

wherein based on a total sum of the texture coefficients of the (111) surface, the (200) surface, the (220) surface and the (311) surface of the electrolytic copper foil, a sum of texture coefficients of the (220) surface and the (311) surface of the electrolytic copper foil is greater than 60%, and the electrolytic copper foil has an elongation greater than 14%.

18. A secondary battery comprising the copper foil of claim 17.

19. An energy storage system comprising the secondary battery of claim 18.

* * * * *